Dec. 18, 1962    F. L. FISCHER    3,068,699
ACCELERATION-COMPENSATED ALTIMETER
Filed April 21, 1959    6 Sheets-Sheet 3

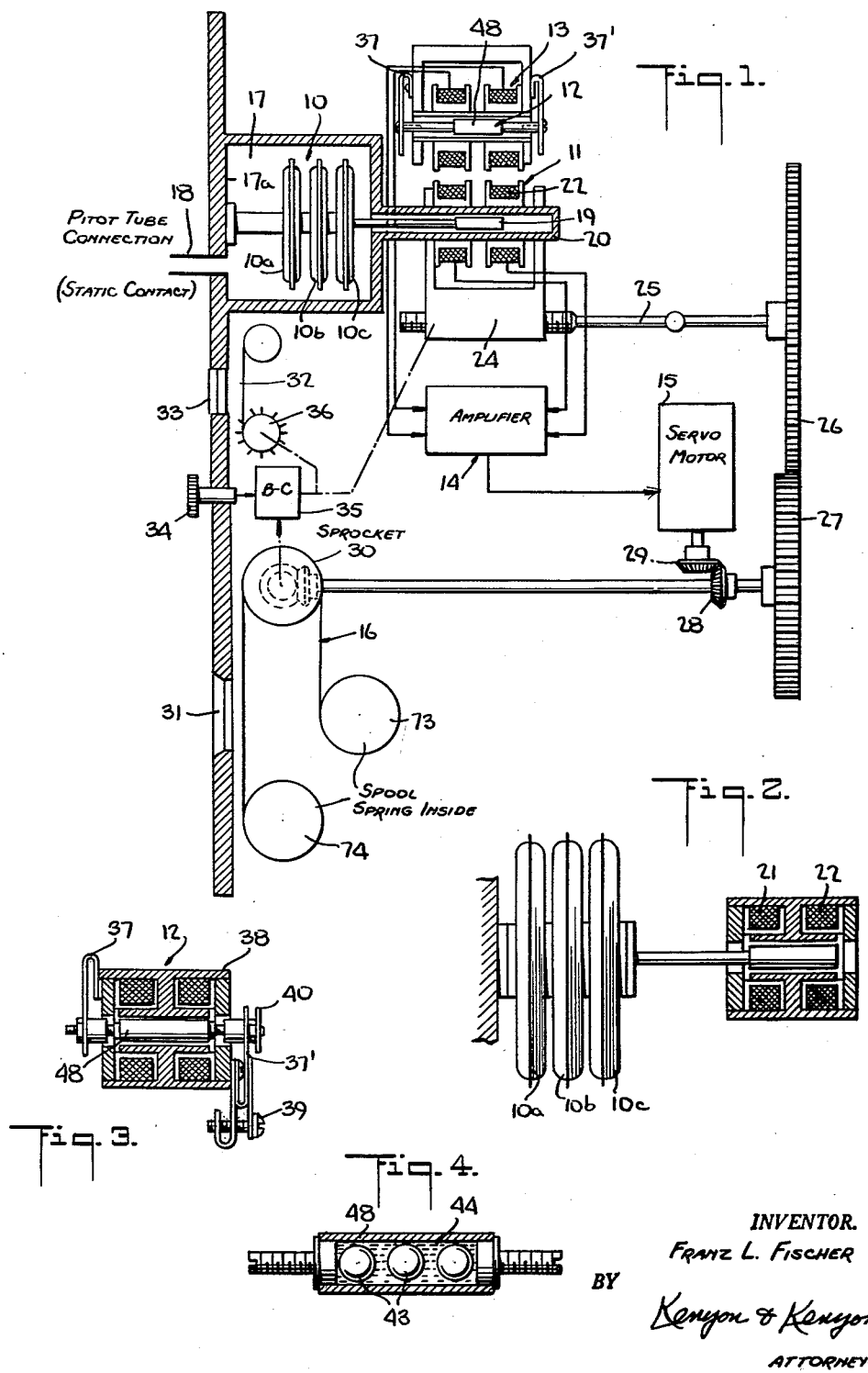

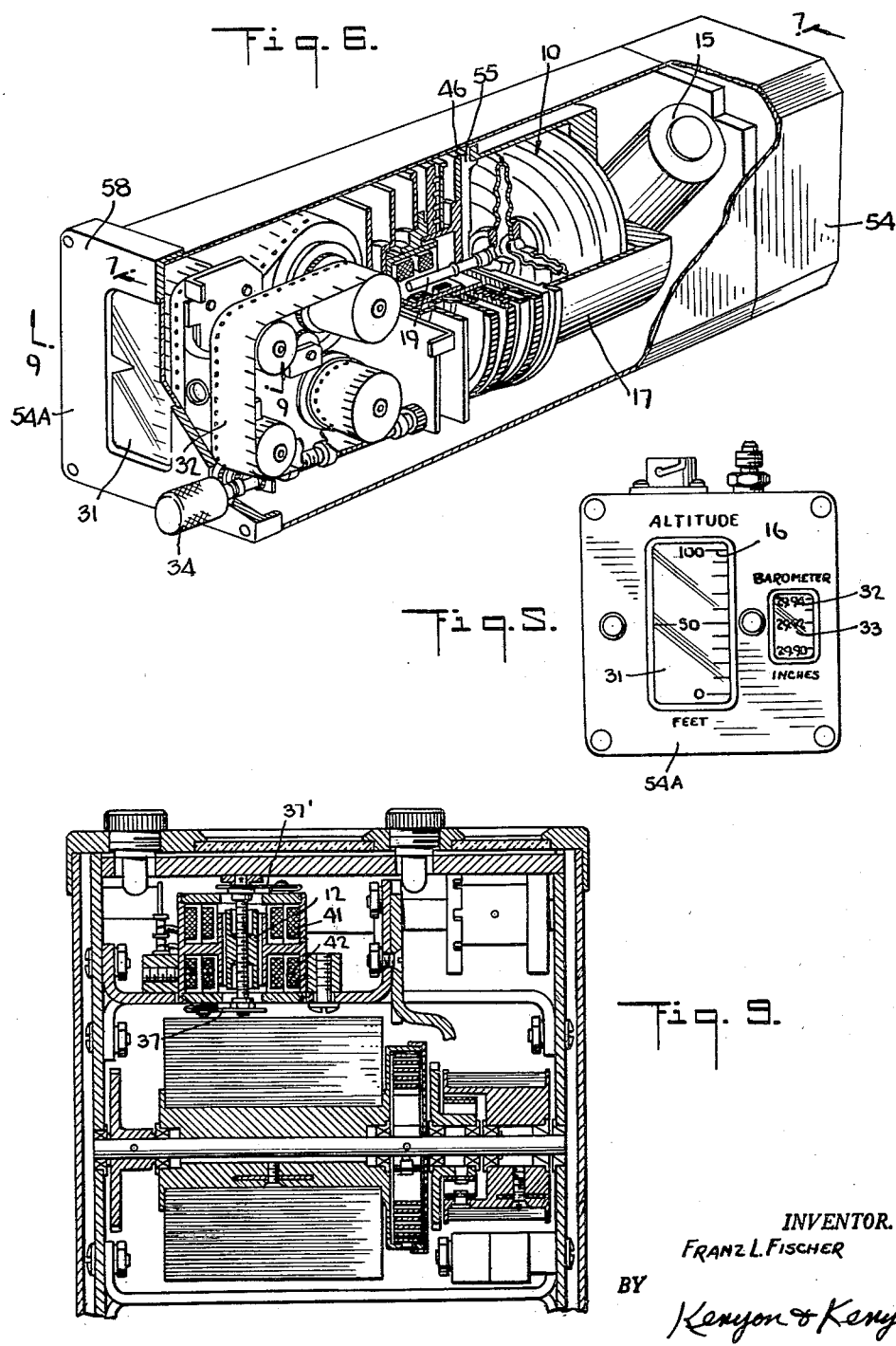

INVENTOR.
FRANZ L. FISCHER

BY Kenyon & Kenyon
ATTORNEYS

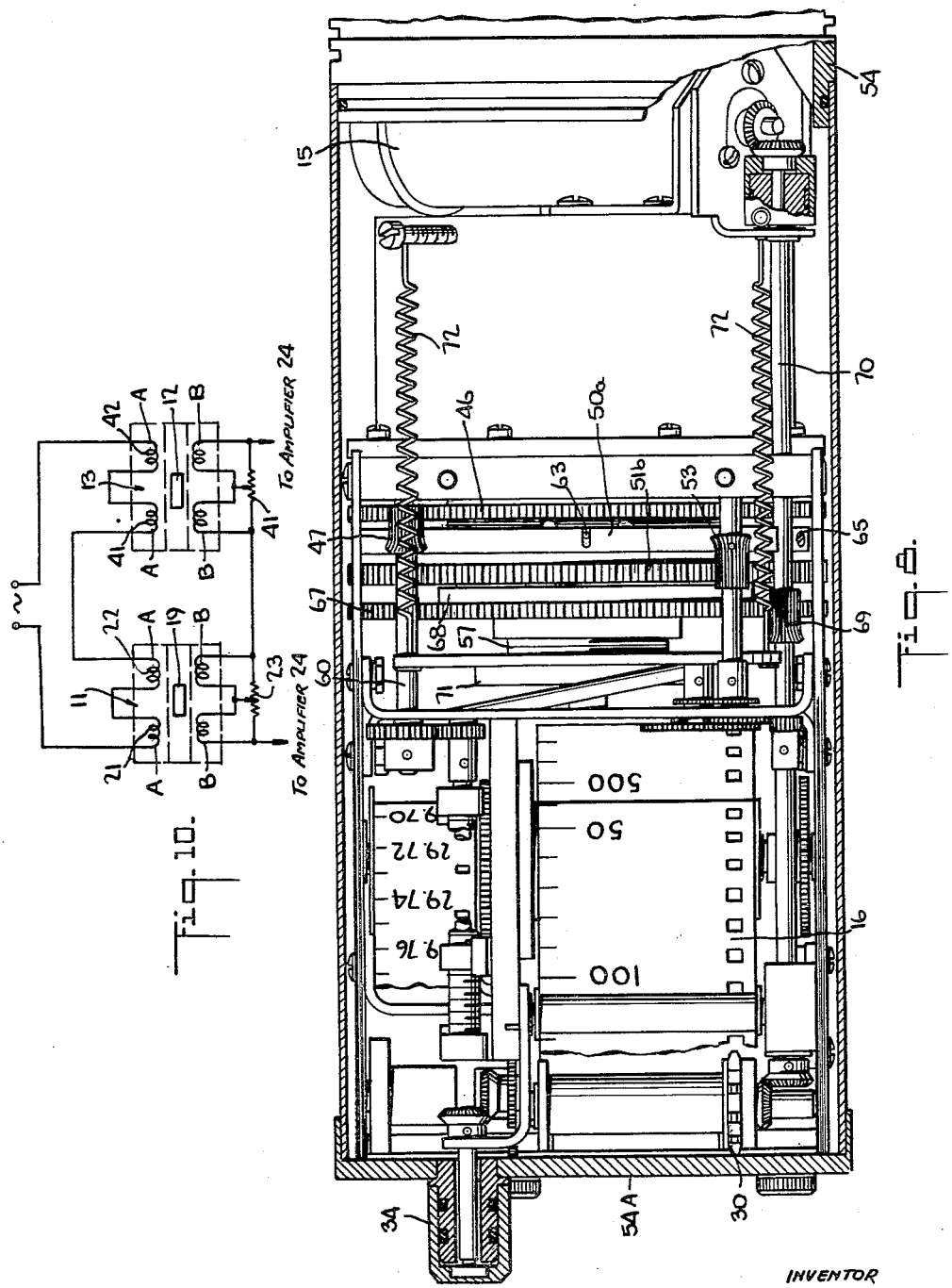

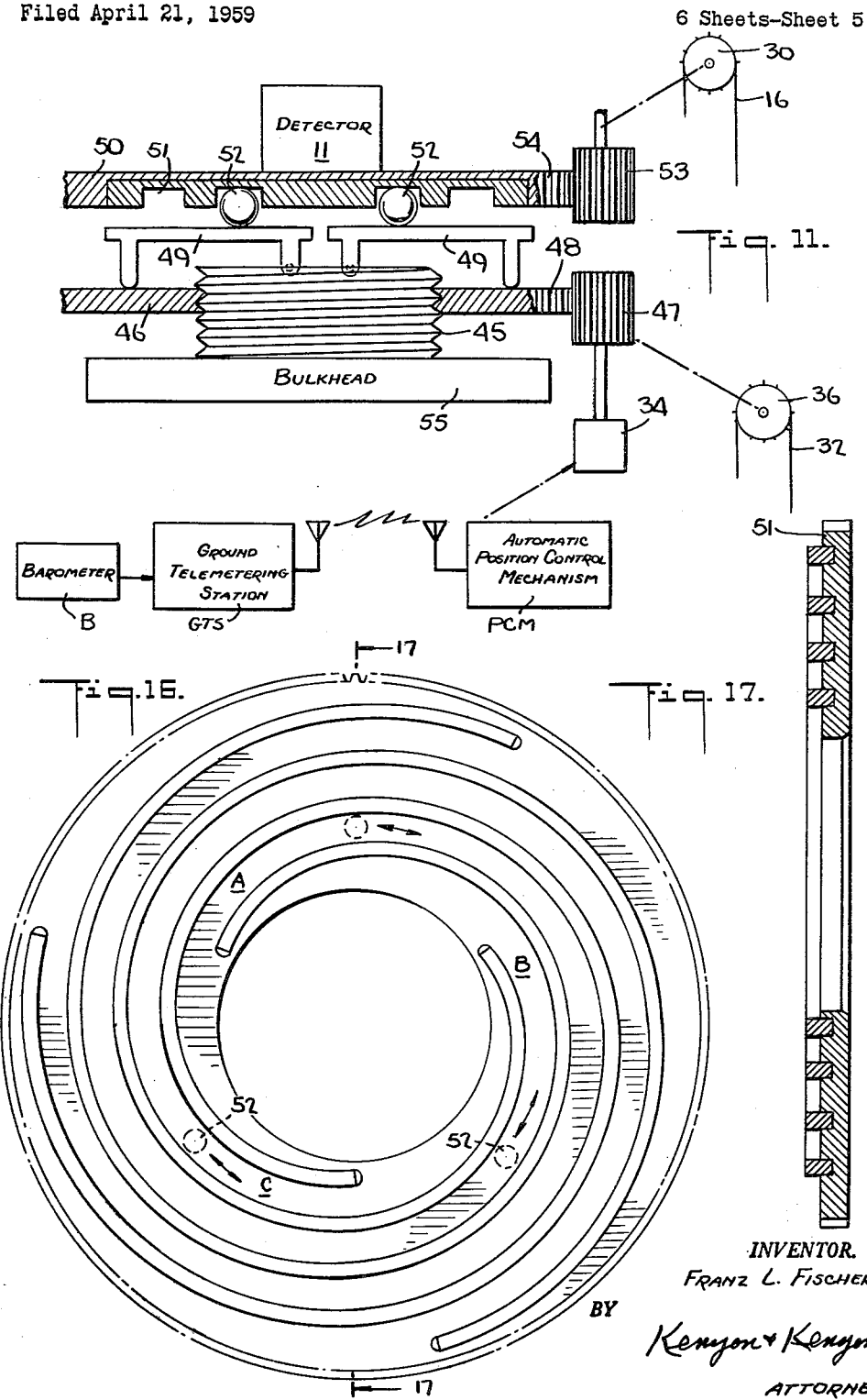

Dec. 18, 1962   F. L. FISCHER   3,068,699
ACCELERATION-COMPENSATED ALTIMETER
Filed April 21, 1959   6 Sheets-Sheet 6
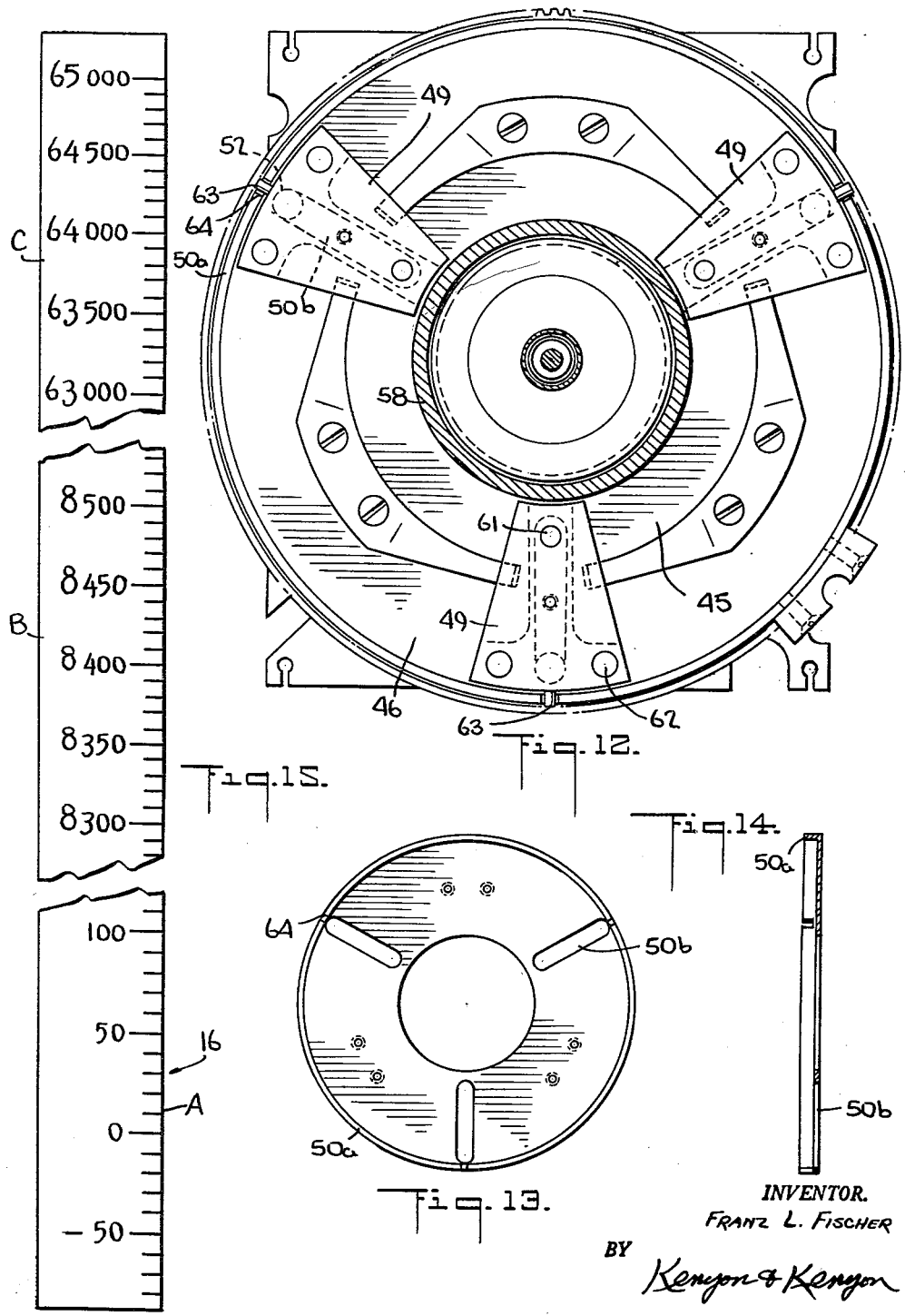
INVENTOR.
Franz L. Fischer
BY
Kenyon & Kenyon
ATTORNEYS United States Patent Office 3,068,699
Patented Dec. 18, 1962

3,068,699
ACCELERATION-COMPENSATED ALTIMETER
Franz L. Fischer, Port Chester, N.Y., assignor to Bulova Research and Development Laboratories, Inc., Woodside, Long Island, N.Y., a corporation of New York
Filed Apr. 21, 1959, Ser. No. 807,782
5 Claims. (Cl. 73—386)

The present invention relates generally to pressure-sensitive instruments and more particularly to aircraft altimeters of the aneroid type. The invention constitutes an improvement over prior art devices as well as over altimeter structures of the type disclosed and claimed in the copending application of Franz L. Fischer, entitled "Improved Altimeter," filed April 12, 1957, Serial No. 652,592, now Patent No. 2,969,675.

The basic elements of an altimeter of the aneroid type are an actuating mechanism in the form of one or more pressure-sensitive capsules, the movement of the expansible capsules being amplified by a transmission device and applied to a suitable indicator. Ideally, an altimeter will respond instantly and accurately to changes in ambient pressure, however minute, thereby affording precise readings of altitude. But altimeters of existing design are subject to a number of drawbacks which materially impair their sensitivity and give rise to spurious readings.

An accurate, sensitive and reliable altimeter is of the utmost importance in airborne installations, particularly in connection with blind landing systems and in flight over difficult terrain where even small errors in altimeter readings may have serious consequences. Conventional instruments are deficient in this regard, for their sensitivity is affected adversely by friction and lag effects in the transmission device. Moreover, the accuracy of existing altimeters is disturbed by variations in ambient temperature as well as acceleration and gravitational forces encountered in aircraft operation.

A number of recent air disasters have been imputed to defective altimeter readings and the need for accurate and reliable altimeters has become a matter of highest urgency. During the past five and one-half years there have been no less than twenty-eight accidents in which the aircraft altimeter was considered either a direct or suspected factor.

In altimeters of conventional design, the presentation is generally made by dial pointers. When the indication is changing rapidly, as occurs for example in landing operations, it is very easy for the pilot to misjudge the pointer position in relation to the calibration. This factor is a further drawback in conventional instruments.

Another major source of error in conventional altimeters results from barometric corrections predicated on a predetermined sea level pressure value. The input of an altimeter is barometric pressure, whereas its output is, or should be, indicative of altitude above sea level. It is the current practice to correct for barometric pressure on the assumption that at sea level the barometer reads 29.9213 inches, which is the mercury level at a mercury temperature of 32° Fahrenheit. This assumption is followed in published tables in which barometric pressure values appear in one column and corresponding altitude values appear in an adjacent column. However, this assumption is seldom true, for barometric pressure at sea level is constantly varying.

As is well known, variations in atmospheric pressure depend on weather and reach a maximum at sea level where they have a range of about 3 inches of mercury, while they approach zero at heights near the upper limit of the atmosphere. Hence, a barometric correction appropriate to sea level becomes more and more excessive with an increase in altitude.

In view of the foregoing, it is the principal object of the present invention to overcome the drawbacks inherent in instruments and to provide an altimeter of exceptional sensitivity which gives instantaneous and accurate readings over the entire operating range. An instrument in accordance with the invention significantly improves the safety factor in aircraft operation and is particularly valuable for close traffic control.

More specifically, it is an object of the invention to provide an altimeter in which the movements of the pressure-sensitive capsule unit are transmitted electrically to an indicating system, thereby freeing the sensing element from mechanical work. The consequent elimination of friction and loading effects produces a sensitivity of a high order and permits the capsules to develop their inherent accuracy to the fullest extent.

Another object of the invention is to provide an altimeter having a barometric correction mechanism which automatically computes the product of two factors, the first of which is the difference between the value of barometric pressure, measured at sea level, and 29.9213, the second of which depends on the pressure corresponding to the momentary altitude of the instrument above sea level. Thus the barometric adjustment introduced into the instrument takes into account the variables requiring correction.

A further object of the invention is to provide an altimeter constituted by a pressure-sensitive system operating in conjunction with an acceleration compensator whereby the altimeter is rendered substantially immune to accelerating and gravitational forces.

It is yet another object of the invention to provide an altimeter structure in which electrical network values are varied both as a function of the movement of a barometric sensing element and the movement of an acceleration compensating element.

Still another object of the invention is to provide altimeter scales so graduated as to minimize the possibility of a mistaken reading no matter how fast the indication is changing.

Another significant feature of the invention lies in the fact that the servo system acts substantially without lag, whereby the speed of the servo motor becomes a true and instantaneous expression of the rate of change in air pressure. This rate of change may be directly indicated or utilized to carry out control functions.

The invention is further characterized by a simple, sturdy and compact mechanical design which minimizes space requirements in aircraft installations.

Briefly stated, these objects are attained in an altimeter constituted by a pressure-sensing unit provided with a ferro-magnetic armature whose position is caused to vary as the unit expands and contracts. The armature reciprocates within a differential transformer to produce a signal which is fed to a servo system acting to shift the differential transformer to a null point relative to the armature. The servo system is operatively coupled to an indicating scale calibrated logarithmically in terms of altitude and follows the true altitude without fluctuation or "hunting."

The output of the differential transformer is ordinarily contaminated with an acceleration component, this unwanted component is eliminated by the use of an accelerometer dynamically equivalent to the pressure-sensing unit but responsive solely to accelerations. The accelerometer generates an output which at all times is equal and opposite to the acceleration component of the pressure-sensing unit so as to neutralize said component.

To effect barometric correction of the altimeter, a correction mechanism is provided which automatically computes the product of two factors, one of which is the difference between actual sea level pressure and a reference value, the other depending on the pressure corresponding to the momentary altitude of the instrument above sea level. The computed quantity acts to shift the differential transformer with respect to the ferromagnetic armature so as to afford a true barometric correction.

While the invention is described herein in the context of altimeters, it will be appreciated that it also has application to other problems of pressure-sensing.

For a better understanding of the invention, as well as other objects and further features thereof, reference is had to the following detailed description to be read in conjunction with the accompanying drawings, wherein like components in the several views are identified by like reference numerals.

In the drawings:

FIG. 1 is a block diagram illustrative of the fundamental principles underlying the invention.

FIG. 2 is a schematic diagram of the barometric sensing element and the magnetic detector therefor.

FIG. 3 is a schematic view of the acceleration compensator and the magnetic detector therefor.

FIG. 4 is a modified form of armature for the acceleration compensator.

FIG. 5 is a face view showing the operating panel of an instrument in accordance with the invention.

FIG. 6 is a perspective view of the instrument which is cut away to show the internal structure.

FIG. 8 is another longitudinal section taken along the plane indicated by line 8—8 in FIG. 6.

FIG. 9 is a sectional view of the instrument taken along the line 9—9 in FIG. 7.

FIG. 10 is a schematic diagram of the electrical control circuit of the instrument.

FIG. 11 is a diagrammatic showing of the barometric correction mechanism.

FIG. 12 is a plan view of part of the barometric correction structure.

FIG. 13 is a separate showing of the flange plate of the barometric correction structure.

FIG. 14 is an end view of the flange plate.

FIG. 15 illustrates three samples A, B and C of the logarithmic tape employed in the altimeter.

FIG. 16 is a plan view of the scroll plate used in the barometric correction mechanism.

FIG. 17 is a section taken through the plane of lines 17—17 in FIG. 16.

*General Principles of Operation*

Figure 7:
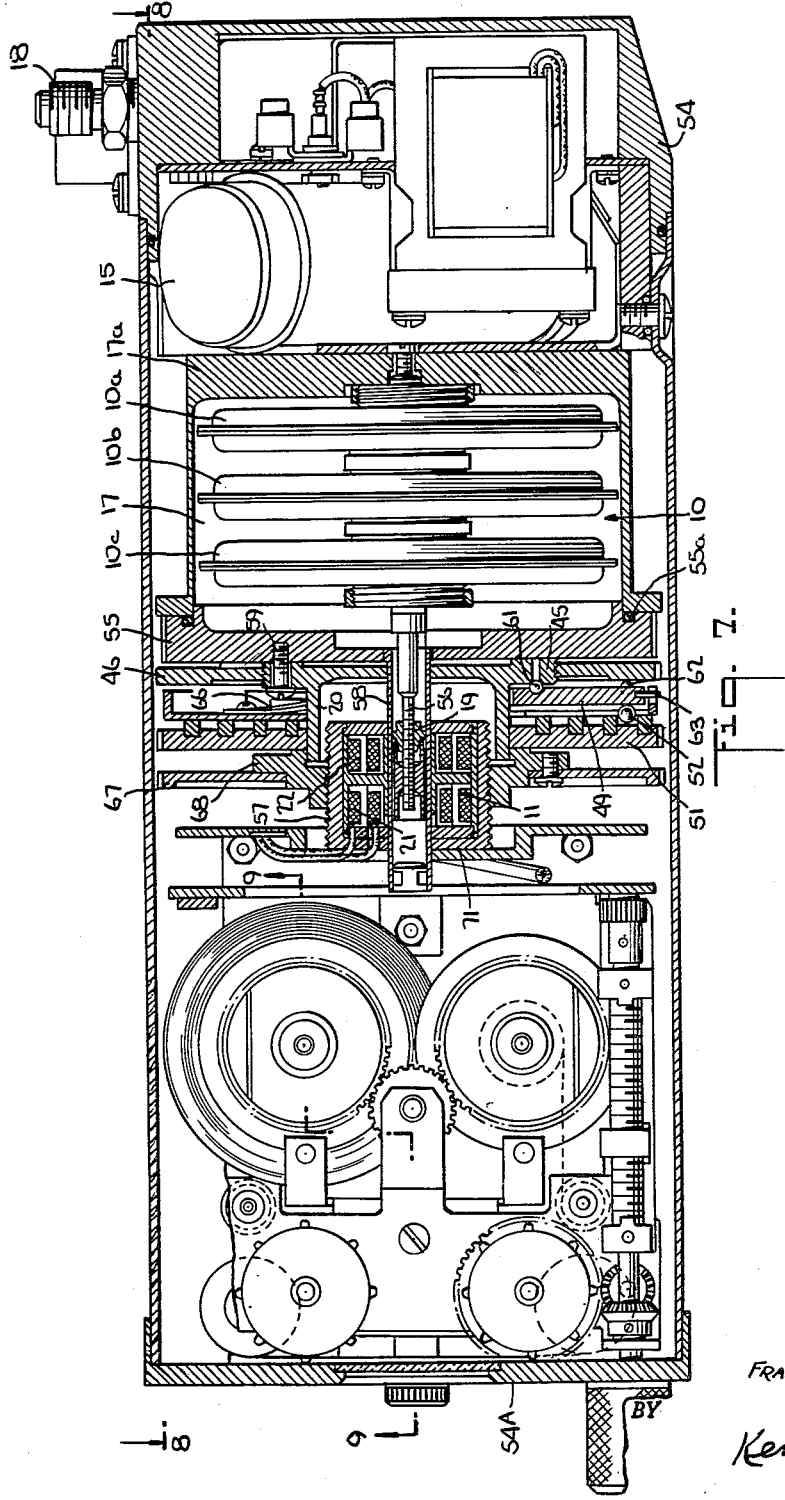
FIG. 7 is a longitudinal section of the instrument taken along the plane indicated by the line 7—7 in FIG. 6.

Referring now to the drawings, and more particularly to the block diagram in FIG. 1, the altimeter in accordance with the invention comprises a barometric pressure-sensing unit 10, a magnetic pressure-responsive transducer or detector 11 for the sensing unit, an acceleration compensator 12, a magnetic pressure-independent transducer or detector 13 for the compensator, an amplifier 14 coupled to both detectors, and a servo motor 15 controlled by said amplifier and adapted to shift the position of the detector 11 to a null point and simultaneously drive a main tape indicator 16.

Pressure-sensing unit 10 is constituted by a stacked assembly of three capsules 10a, 10b and 10c, which are joined together serially at their center hubs. The sensing unit is mounted within a gas-tight chamber 17. Outside pressure to be measured is communicated to the chamber by way of a pressure connection and Pitot tube 18 coupled to an outside static pressure tube.

The stack of capsules is supported only at one end where it is fixedly secured to the side wall 17a of the chamber, whereby the stack is unloaded and free to expand and contract. Carried at the free end of the stack is a ferromagnetic or soft iron armature 19 which reciprocates axially within a tubular extension 20. The extension is fabricated of non-magnetic material and projects from chamber 17 in communication therewith.

The capsules are individually evacuated and preferably are of the concentrically corrugated diaphragm type disclosed in the patent to Melchior No. 2,760,260. By a method of diaphragm forming, the heat treatment and cold working, optimum capsule characteristics are obtained. Corrosion-resistant material is preferably used in fabricating the capsules. One useful material for this purpose is the nickel alloy "Ni-span-C" manufactured by the International Nickel Company.

In a practical embodiment of the invention, a change in pressure of one atmosphere or 30 inches of mercury causes a single capsule in the stack to change its axial length by exactly one-eighth of an inch. Since three capsules 10a, 10b and 10c are connected in series, the total stroke is three-eighths of an inch for a change in altitude from sea level up to 100,000 feet. In practice, therefore, considerable multiplication must be effected between the capsule motion and the indicator to be read by the pilot. In accordance with the invention, the multiplication is produced without imposing any load, frictional or otherwise, on the capsules themselves.

This is accomplished by using the magnetic detector 11 to measure capsule expansion and contraction. Magnetic detector 11 is constituted by a differential transformer having a pair of coils 21 and 22 which surround tubular extension 20 at spaced locations thereon. Increasing altitude causes expansion of the capsules in the sensing assembly, thus moving armature 19 through the center of the coils, whereas decreasing altitude causes contraction and movement of the armature in the opposite direction.

As best seen in FIG. 10, each of coils 21 and 22 is constituted by a primary winding A and a secondary winding B forming a transformer in conjunction with armature 19. The primary windings 21A and 22A are serially connected to a common source of alternating current, which in aircraft installations is usually a 400 cycle supply. Maximum voltage is induced in a secondary winding of a given transformer when the associated core is fully inserted therein to provide a high permeability path between primary and secondary. However, when the core is fully inserted in say transformer 21A—21B, it is entirely withdrawn from the other transformer 22A—22B of the pair and the induced voltage in the latter is at its minimum value. But when core 19 occupies a mid-position between transformers, the voltages induced in the secondaries are exactly equal, such that when the core is displaced from mid-position, the voltages have relative magnitude depending on the direction and extent of displacement.

Secondaries 20B and 21B are serially connected as a control circuit to the input of servo amplifier 14. Connected across these secondaries is a balancing potentiometer 23 whose adjustable tap is connected to the junction of the secondaries. With this arrangement the output of secondaries 20B and 21B can only be kept in balance when the armature 19 occupies a null position between them, hence any change from null position because of altitude or pressure changes will generate an alternating-current signal in one direction or the other.

The output from the secondary windings 21B and 22B acts to control servo motor 15 in a direction and to an extent restoring the coils 21 and 22 to the null position with respect to the displaced armature 19. The motor also acts to move the tape scale 16 proportionally.

Coils 21 and 22 are carried in a frame 24 which is caused to traverse to the right or left by a lead screw 25, operated through gears 26 and 27 by motor 15. The motor also drives the sprocket wheel 30 for the main scale tape 16 through bevel gears 28 and 29. The movement of the tape past the window 31 thus reproduces the displacement of the armature 19 due to a pressure change with a considerable magnification which may be in the order for example of 2000 to 1.

Also provided is an auxiliary scale 32 which is calibrated in sea level barometric values and is exposed to view through a window 33, the scale position being manually adjusted by a knob 34 which is operatively coupled through a barometric correction device 35 (to be later described) to the sprocket wheel 36 for the auxiliary tape 33 and to the coil frame 24. Rotation of knob 34 acts to zero-set the coils relative to core 19 for existing sea level barometric conditions, the barometric correction device 35 introducing a barometric correction according to the momentary height of the barometer at sea level.

When the coils are zero-set, the core at sea level occupies a mid-position relative to the two coils to produce a null signal. Above sea level, the core is shifted relative to the coils to produce a signal which causes the servo to shift the coils so as to re-establish the null.

The auxiliary scale 32 is preferably graduated from 28.00 to 31.00 inches of mercury, and since it refers to pressure it is approximately linear, whereas the calibration of the main scale 16 which indicates height is logarithmic. As shown in FIG. 15, the low level section A of the tape 16 is relatively expanded, thereby facilitating readings at low altitudes where accuracy is of crucial importance. In one practical embodiment of the invention the numbered graduations are separated a full inch for each 50 feet of altitude. At 20,000 feet, the numbered graduations mark each 100 feet; at 40,000 feet the graduations stand for 200 foot increments, and from 60,000 feet up the increments are of 500 feet each. There are smaller unnumbered graduations dividing each of the major scale segments. This tape presentation therefore supplies greater accuracy and readability where most needed at lower elevations and landing altitudes.

*Acceleration Compensation*

If the altimeter is up-ended so that the capsule stack 10 is disposed vertically, the capsules and associated armature 19 will sag slightly under their own weight, thereby introducing an error into the height reading. The same error occurs with other accelerations beside that of gravity.

To eliminate acceleration error, the acceleration compensator 12 is provided with a ferromagnetic armature 48 which acts in conjunction with the magnetic transducer detector 13 to introduce into amplifier 14 a correction signal. As best seen in FIG. 3, the armature 48 is supported for parallel motion on a pair of leaf springs 37 and 37' from the casing 38 of the magnetic detector 13. Spring 37' is provided with an adjustment screw 39 by which it can be deflected to bring armature 48 to its null position in the absence of any acceleration.

To ensure that for a given acceleration the signal given by the accelerometer shall be equal to that given by the capsule detector 11, a circular weight 40 is threadably received on one end of the armature 48. The mass of the weight 40 is so selected as to cause the two signals to neutralize each other. The weight selection may be effected by filing or turning down the weight. Thus the pressure-sensing unit and the accelerometer are dynamically balanced.

The magnetic detector 13 for the acceleration compensating armature 48 is constituted by a differential transformer having a pair of coils 41 and 42. Coils 41 and 42 are provided with primaries A and secondaries B, the primaries being connected in series to the alternating-current input source and the secondaries being serially connected to the input of amplifier 14 in a reverse phase relative to that of the coils 20B and 21B of the magnetic detector for the sensing unit.

Any acceleration will displace both armatures 48 and 19 to the same extent and the outputs from the two differential transformers 11 and 13 due to such acceleration will be equal and opposite, and thereby nullify one another in the amplifier. Consequently the height reading will not be influenced by acceleration.

The accelerometer armature 48 tends to respond heavily to vibrations introduced by the mounting, because the leaf springs have practically no damping. Therefore, as as shown in FIG. 4, a damping device is built into this armature consisting of a number of anti-magnetic metal balls 43 immersed in a damping fluid 44 of high but constant viscosity. The capsule set 10, on the other hand, is readily damped by dissipating energy into the air surrounding the capsules. At very low pressures, however (very high altitude), a damping armature, as above described, may be required for the capsule set as well.

*Barometric Correction*

As pointed out above, it is essential to introduce into the altimeter a correction based on the momentary sea level value to correct for variations in atmospheric pressure. In accordance with the invention, a barometric correction device, indicated generally by block 35 in FIG. 1, is provided which automatically computes the product of two factors and introduces this product to the observed altitude reading by shifting the windings of the differential transformer 21—22 of magnetic detector 11 axially with respect to armature 19.

The two factors whose product is computed are (a) a factor determined by the difference between the barometric sea level pressure at the time of the reading and 29.9213, and (b) a factor depending on the pressure corresponding to the momentary altitude of the instrument above sea level. The value 29.9213 represents, in inches of mercury, the standard barometric reading at sea level at a temperature of 32° F.

The principle underlying the mechanism is illustrated diagrammatically in FIG. 11, where the element 45 is a fixed screw on which a nut 46 having a toothed edge can be manually rotated by operation of the front panel knob 34 (note FIG. 1) through a pinion 47. Screw 45 is mounted on a base or bulkhead 55. Levers 49 are hinged on top of screw 45 with their outer ends resting on top of nut 46. It will be evident that when knob 34 is turned this will cause nut 46 to ride up or down screw 45 depending on the turning direction and thereby simultaneously change the slope of levers 49 relative to the nut.

The differential transformer 21—22 constituting the magnetic detector 11 for the sensing unit rests on top of a flange 50. Attached to the underside of the flange is a scroll plate 51 having spiral grooves acting as a track for balls 52 lying on levers 49. In practice three balls are used and three levers spaced 120 degrees apart. The periphery of flange 50 is toothed and is driven by a pinion 53. Rotation of the scroll plate 51 causes balls 52 to move radially along levers 49, the balls always being equidistant from the lever hinges.

Pinion 53 is operatively coupled to the sprocket wheel 30 which transports the main altimeter scale 16. Hence pinion 53 is turned according to existing altitude. Pinion 47 is operatively coupled to sprocket wheel 36 which transports the auxiliary scale 32. It will be seen that if knob 34 is manually set by the auxiliary scale 32 to the sea level barometer value of the day, and if pinion 53 is turned in accordance with the existing altitude, then the flange 50 and the detector 11 thereon will be raised or lowered with reference to the base 55 by a distance depending on the steepness of the hills of levers 49 and on the distance the balls have been rolled up these hills by rotation of flange 50.

Thus the position assumed by the detector 11 is the computed product of the two factors mentioned above and the barometric correction takes into account both the actual sea level reading and the altitude reading at the time.

The knob 34 has been described as manually operated. In practice, the knob may operate automatically by the use of a telemetering system including a position-control mechanism PCM responsive to appropriate signals from a ground radio station GTS provided with a barometer B to read sea level atmospheric pressure. The ground station may take the form of an automatic glide path landing system radiating a signal pattern to direct the plane onto a landing field, which signal may be made to carry a data component for zero-setting the altimeter.

The Altimeter Instrument

Referring now to FIGS. 6 to 9, a preferred embodiment of an actual instrument constructed in accordance with the invention is shown, the instrument being housed within an elongated casing having a generally rectangular cross-sectional area, the rear of the casing being enclosed by a cover 54 and the front end by a face plate 54a having a window 31 for exposing the main tape 16 and a window 33 for exposing the auxiliary tape 32.

The sensing unit 10 is housed within the sealed chamber 17, ambient air pressure being introduced therein through a tube leading to the pipe coupler 18 projecting from the rear of the casing. The chamber is formed by a container mounted against the bulkhead 55 disposed centrally in the casing, a sealing ring 55a being provided hermetically to seal the container against the bulkhead. The container is made of a material, such as magnesium, having a temperature coefficient which matches that of the capsules so as to preclude or minimize temperature effects.

In practice, the instrument may be installed in an aircraft having a pressurized cabin, the sealed chamber 17 being put into communication with the exterior air pressure by means of a suitable pipe attached to coupler 18. Those components of the instrument which are not in the chamber 17 are subjected to the internal pressure of the aircraft which is generally maintained at a constant level.

The ferromagnetic armature or rod 19 is attached to the end capsule 10c by a threaded shaft 56, the rod reciprocating in the extension 20 communicating with chamber 17. Slidably mounted on extension 20 and concentric therewith is an externally-threaded cylindrical housing 57 which encases the differential transformer coils 21 and 22 of the magnetic detector 11, the housing having two sections one for each annular coil.

Housing 57 is mounted concentrically within a tubular sleeve 58 having an externally-threaded enlarged base constituting the screw 45 of the barometric compensator. The sleeve 58 is secured by bolts 59 to the bulkhead 55. Turntable on screw 45 is the nut 46 (note FIGS. 6 and 7), the nut being driven by pinion 47 coupled through a shaft 60 and a series of coupling gears to the setting knob 34. Knob 34 is also operatively coupled to the auxiliary barometric correction scale 32.

As best seen in FIG. 12, three levers 49 are provided, the levers being sector shaped. The fulcrum of each lever 49 is a tiny steel ball 61 partly recessed into and secured to the lever and partly resting in a dimple in the base of screw 45. Near the outer end of each lever 49 are two steel balls 62, only one of which is visible in FIG. 7 the other being behind it. These balls 62 are also recessed partially in each lever 49 and rest on nut 46. Each lever is prevented from rotation with nut 46 by a pin 63 received in its outer edge which enters a slot 64 in the flange 50a of the flange plate 50, shown separately in FIG. 13. Flange plate 50 is provided with three equispaced radial openings 50b.

A block 65 attached outside the flange engages a longitudinal member of the frame and prevents angular rotation of flange plate 50 but leaves it free for axial movement.

The scroll plate 51 is shown in section in FIGS. 7 and 17, the scroll plate being centered on the sleeves 58. One of the three balls 52 is shown in the outer groove of the scroll and resting on the face of lever 49. Ball 52 does not turn with the scroll because it is constrained by one of the three radial openings 50b in flange plate 50. Plate 50 is maintained in contact with the lands of the scroll by means of springs 66, the other ends of which rest on levers 49 and keep the balls 62 in contact with nut 46. As best seen in FIG. 16, the scroll plate is divided into three Archimedian spiral tracks, A, B and C, one for each ball, the tracks being displaced 120 degrees relative to each other.

The scroll plate 51 is driven according to pressure by the pinion 53 which is geared to sprocket 30 which transports the main tape 16. Pressed against the back of scroll plate 51 is a gear wheel 67 having a hub 68 which is internally-threaded to engage the externally-threaded housing 57 for the differential transformer.

Gear 67 is driven by a pinion 69 on the transmission shaft 70 from the servo motor 15 so that the transducer coils follow the motion of the capsule driven armature 19. The output of the barometric corrector consists in the changes it produces in the distance between nut 45 and bulkhead 51. To prevent undesired play of the differential transformer, the housing thereof is subjected to tension by means of a cap plate 71 urged against the housing by four springs 72.

The acceleration compensator is best viewed in FIG. 9 where it will be seen that the armature 48, mounted between spring 37 and 37', operates within the differential transformer constituted by coils 41 and 42. The amplifier is positioned in the rear of the casing adjacent the motor and may be constituted by a transistorized circuit.

The rotation of shaft 70 under the control of the servo motor 15 causes rotation of sprocket wheel 30 which acts to unwind main scale tape 16 from a supply spool 73 onto a take-up spool 74. The scale is suitably calibrated in terms of elevation.

The auxiliary and main scale tapes may be formed by motion picture film stock having perforations which are engageable with the teeth on the sprocket wheels. The scale arrangements may be identical with that disclosed in U.S. Patent 2,603,728, issued July 15, 1952, and U.S. Patent 2,656,721, issued October 27, 1953.

The altimeter may be adapted to control external systems such as an autopilot, in which case the output of the servo amplifier may be fed to the external system rather than to the servo motor.

While there has been shown what are considered to be preferred embodiments of the invention, it will be apparent that many changes may be made therein without departing from the essential spirit of the invention as defined in the annexed claims.

What is claimed is:

1. In an altimeter provided with a pressure-sensitive barometric unit, means to detect the movement of the unit in response to changes in pressure to produce an indicating signal, an altitude indicating device and means to apply said indicating signal to said indicating device; a barometric correction mechanism including means to compute the product of a first factor determined by the difference between existing atmospheric pressure at sea level and a predetermined reference value and a second factor depending on atmospheric pressure corresponding to the momentary altitude of the altimeter above sea level, and means to correct said indicating device in accordance with the computed product.

2. An altimeter comprising a pressure-sensitive unit, a first magnetic core attached to said unit and movable therewith, a first magnetic detector surrounding said first core and slidable relative thereto, said first detector producing a control voltage depending on the core position, said first detector being initially positioned relative to said first core to produce a null signal at sea level, servo control means responsive to said control signal and operatively coupled to said detector to shift the position thereof relative to said core to re-establish said null above and below sea level, indicator means operatively coupled to said control means to provide a height reading, and pressure-independent detector means to introduce into said control means a compensating signal depending on the acceleration to which the altimeter is subjected to cancel out the effect of the acceleration component in said control voltage, said compensating means including a second core resiliently mounted to be responsive to acceleration forces and being dynamically balanced with respect to the assembly of said unit and said first core, a second magnetic detector surrounding said second core and fixedly mounted to produce said compensating signal and wherein said second core is supported within the frame of said second detector by springs attached to either end thereof and including an adjustable weight attached to said second core to effect dynamic balance with respect to said assembly.

3. An altimeter comprising a pressure-sensitive unit, a first magnetic core attached to said unit and movable therewith, a first magnetic detector surrounding said first core and slidable relative thereto, said first detector producing a control voltage depending on the core position, said first detector being initially positioned relative to said first core to produce a null signal at sea level, servo control means responsive to said control signal and operatively coupled to said detector to shift the position thereof relative to said core to re-establish said null above and below sea level, indicator means operatively coupled to said control means to provide a height reading, and pressure-independent detector means to introduce into said control means a compensating signal depending on the acceleration to which the altimeter is subjected to cancel out the effect of the acceleration component in said control voltage, said compensating means including a second core resiliently mounted to be responsive to acceleration forces and being dynamically balanced with respect to the assembly of said unit and said first core, a second magnetic detector surrounding said second core and fixedly mounted to produce said compensating signal and wherein said second core is supported within the frame of said second detector by springs attached to either end thereof and wherein said second core is constituted by a hollow member having damping balls therein in a damping fluid.

4. An altimeter of high sensitivity and accuracy comprising an aneroid unit, a sealed chamber for housing said unit and communicating with the atmosphere, a tubular extension on said chamber, a first ferro-magnetic core attached to said unit and reciprocal in said extension in accordance with changes in atmospheric pressure, a first magnetic detector slidably mounted on said extension to produce a control signal which depends on the relative positions of said core and said coils, a servo system responsive to the output of said differential transformer and operatively coupled to said detector to shift the position thereof in a direction and to an extent establishing a null, a main indicating scale operatively coupled to said servo system to provide altitude readings, control means including a barometric correction mechanism to set the initial position of said first detector in accordance with existing atmospheric pressure, an auxiliary scale operatively coupled to said control means to provide barometric readings, and a compensator including a second core resiliently mounted to be independent of pressure and responsive to acceleration and gravitational forces and dynamically balanced with respect to the assembly of said first core and the aneroid unit, a second magnetic detector surrounding said second core and fixedly positioned to produce a compensating signal depending on said forces, and means to apply said compensating signal to said servo system to balance out contaminating components in said control signal, said barometric correction mechanism including means to compute the product of a first factor determined by the difference between existing atmospheric pressure at sea level and 29.9213 and a second factor depending on atmospheric pressure corresponding to the momentary altitude above sea level, the initial position of said first detector being corrected in accordance with said computed product.

5. An altimeter, as set forth in claim 4, wherein said means to compute said product includes a fixedly mounted screw, a nut threadably received on said screw and advanced thereon in accordance with the existing value of atmospheric pressure at sea level, a lever hingedly mounted on said screw, a scroll plate having a spiral track for receiving a ball which rides on said lever, means to rotate said scroll plate in accordance with the movement of said main scale whereby the radial position of said ball in said track and the slope of said lever varies accordingly, and means to shift said first detector axially on said extension in accordance with the slope of said lever.

References Cited in the file of this patent
UNITED STATES PATENTS

| | | |
|---|---|---|
| 2,932,972 | Cosby et al. | Apr. 19, 1960 |
| 3,013,434 | Melchior | Dec. 19, 1961 |

OTHER REFERENCES

Aviation Week, article by Henry Lefer under "Aeronautical Engineering," section, Dec. 5, 1955. (Copy in Patent Office Scientific Library.)